Figure 1:
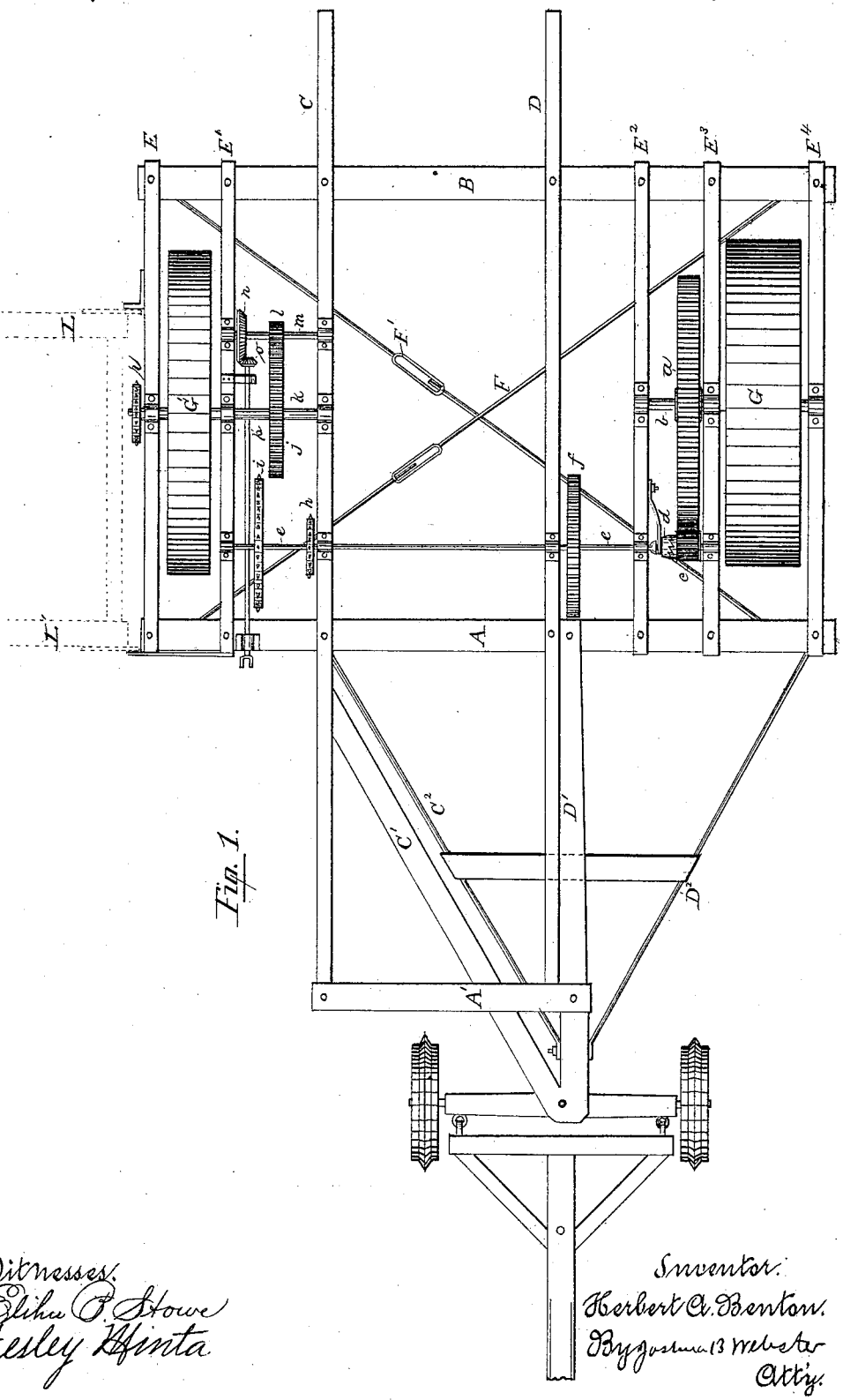

(No Model.) 7 Sheets—Sheet 1.

H. A. BENTON.
COMBINED HEADER AND THRASHER.

No. 338,699. Patented Mar. 30, 1886.

Witnesses:
Elihu P. Stowe
Wesley Hinta

Inventor:
Herbert A. Benton
By Joshua B. Webster
Atty.

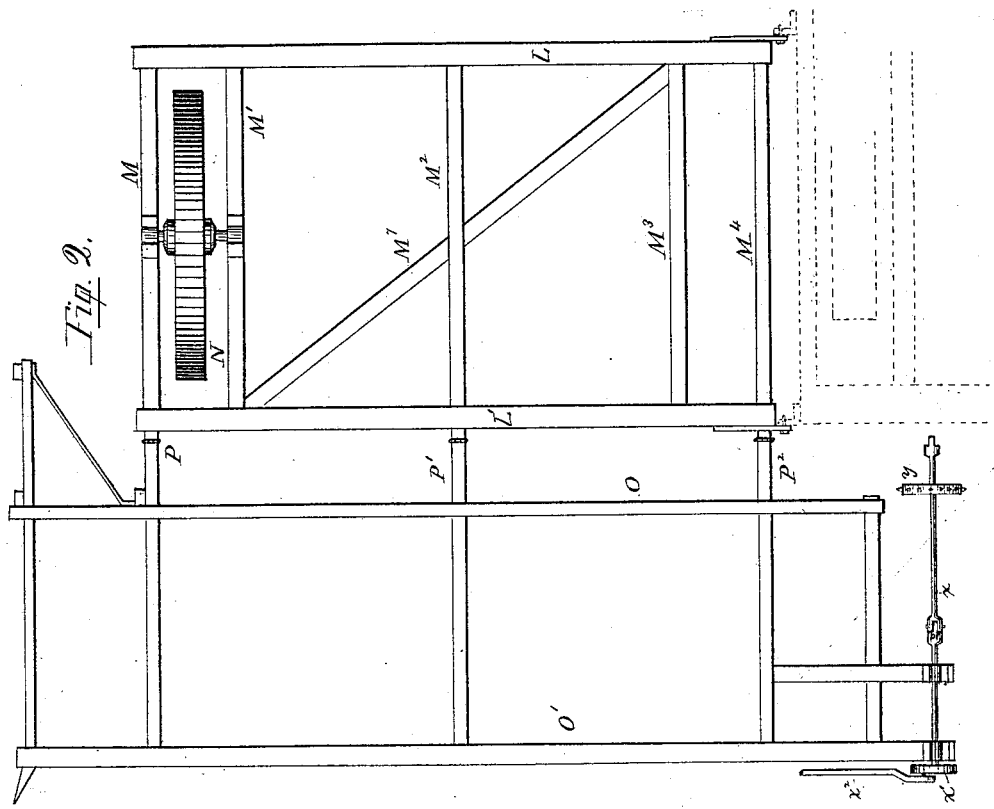

(No Model.)
7 Sheets—Sheet 3.
H. A. BENTON.
COMBINED HEADER AND THRASHER.
No. 338,699. Patented Mar. 30, 1886.
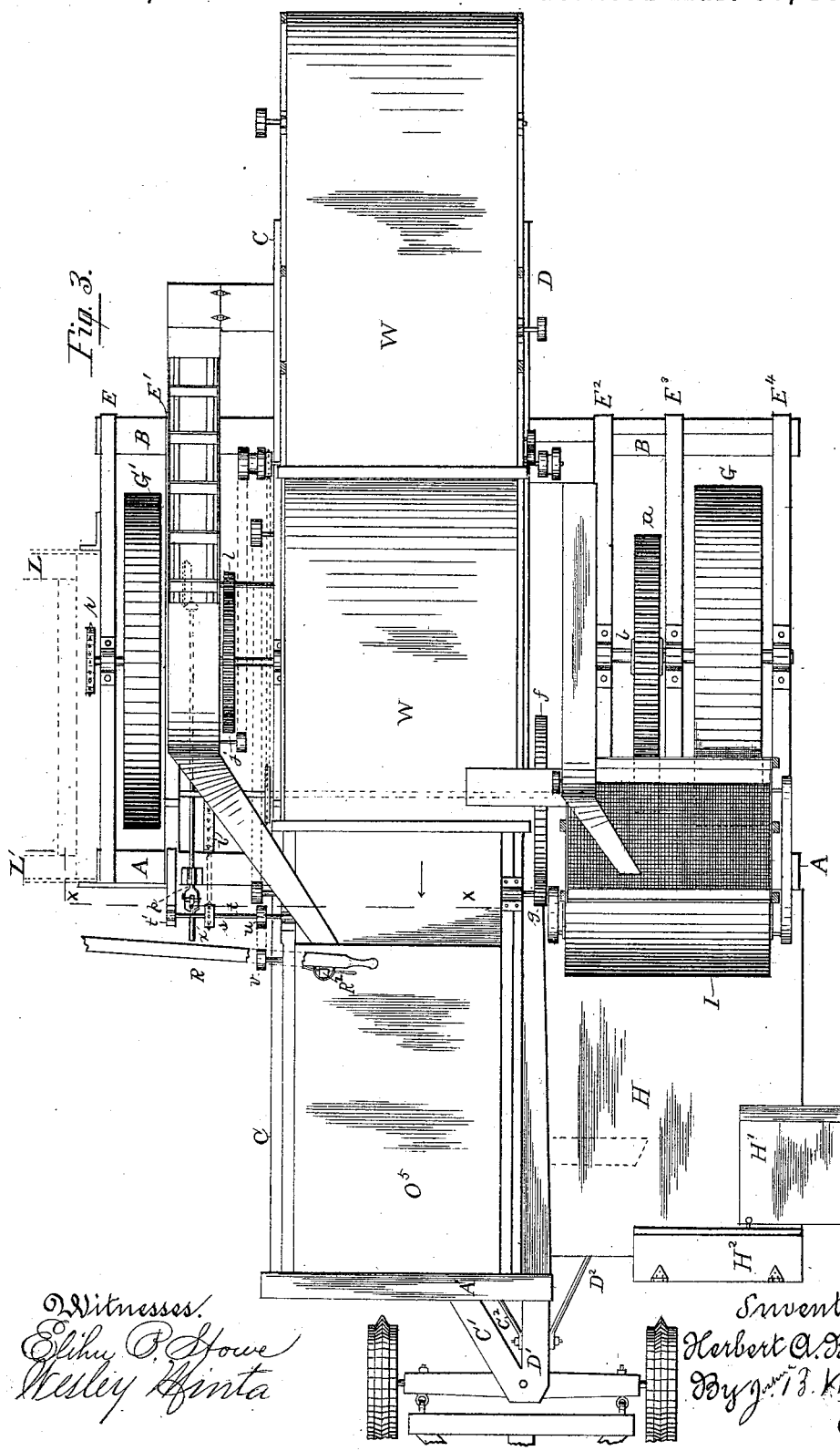

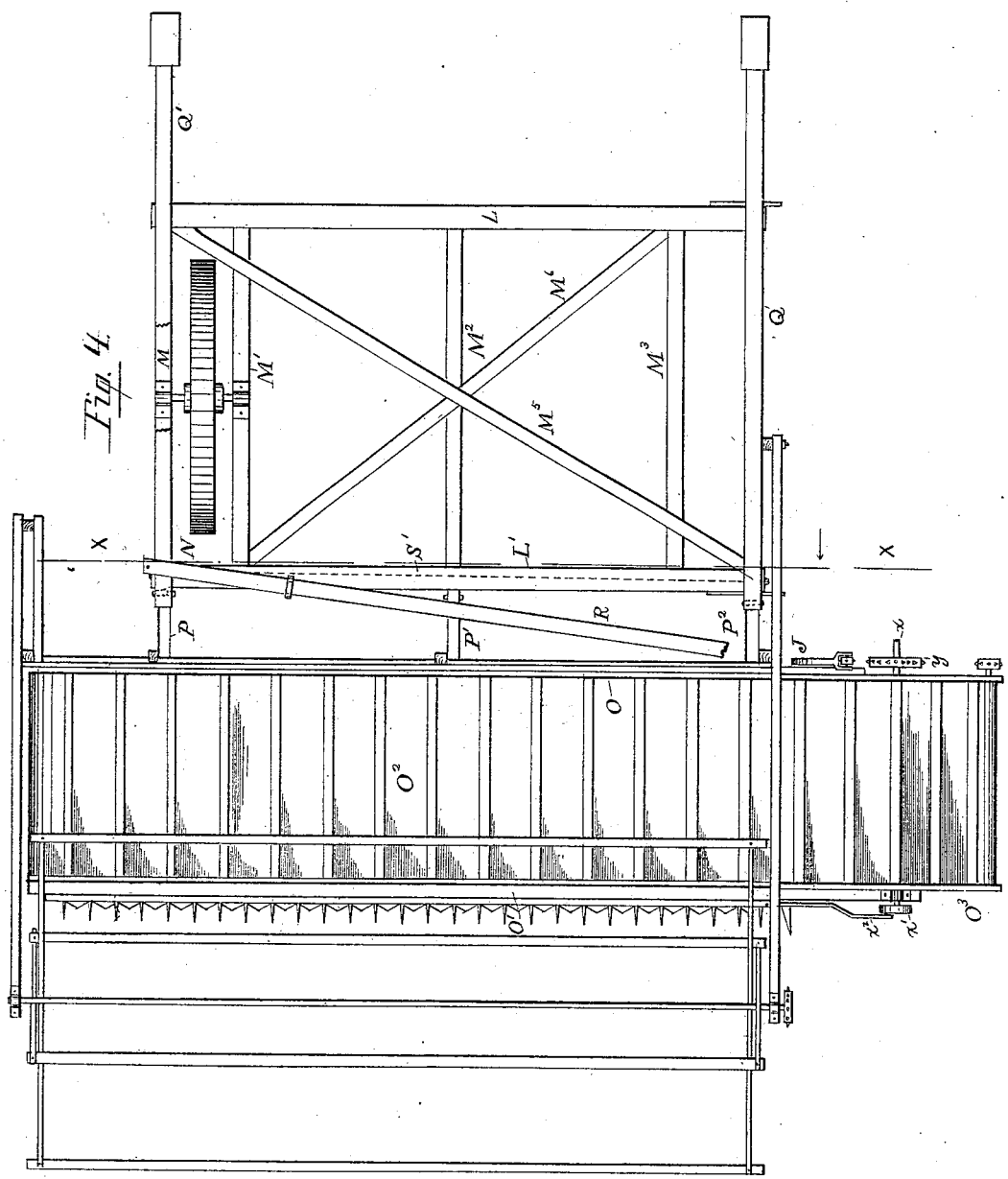

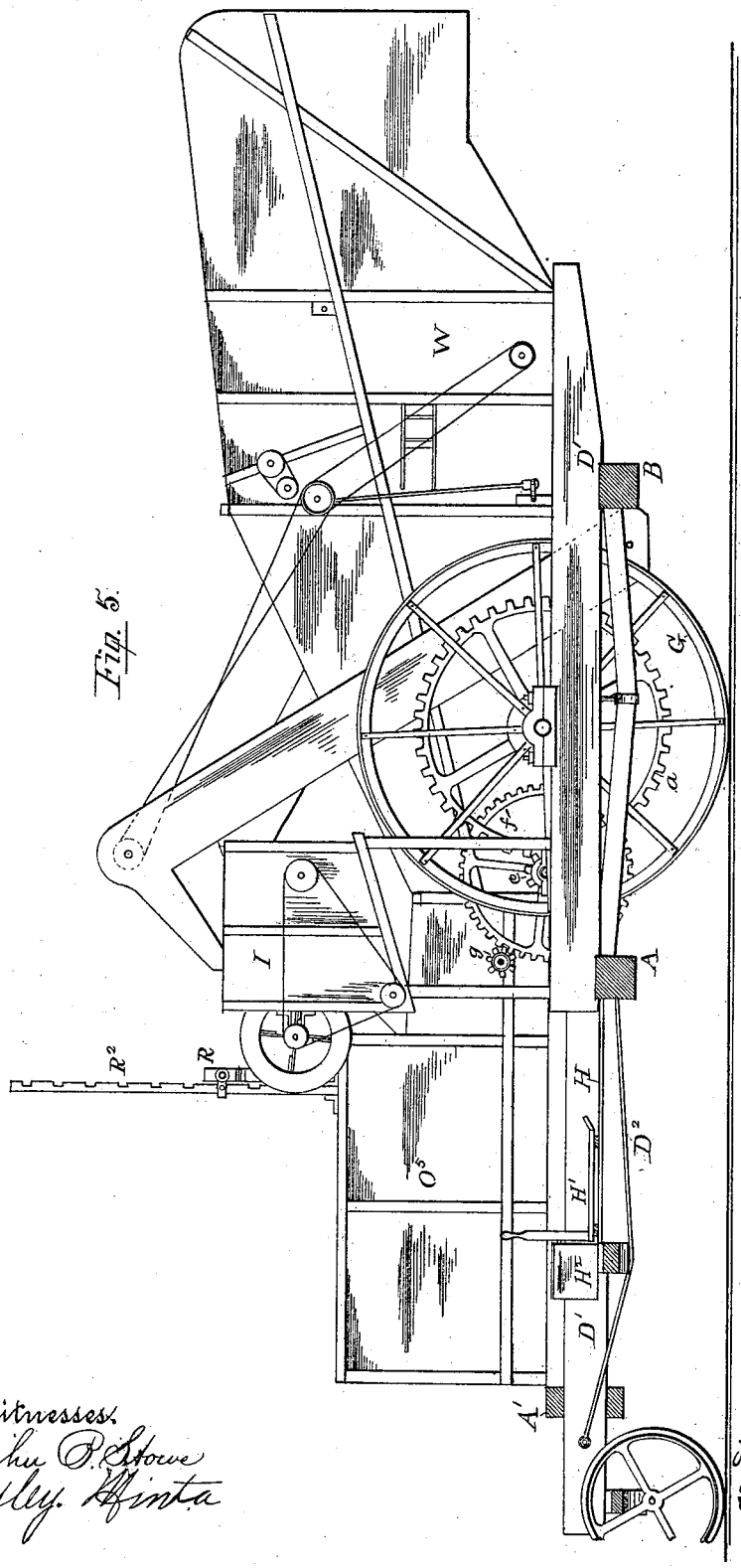

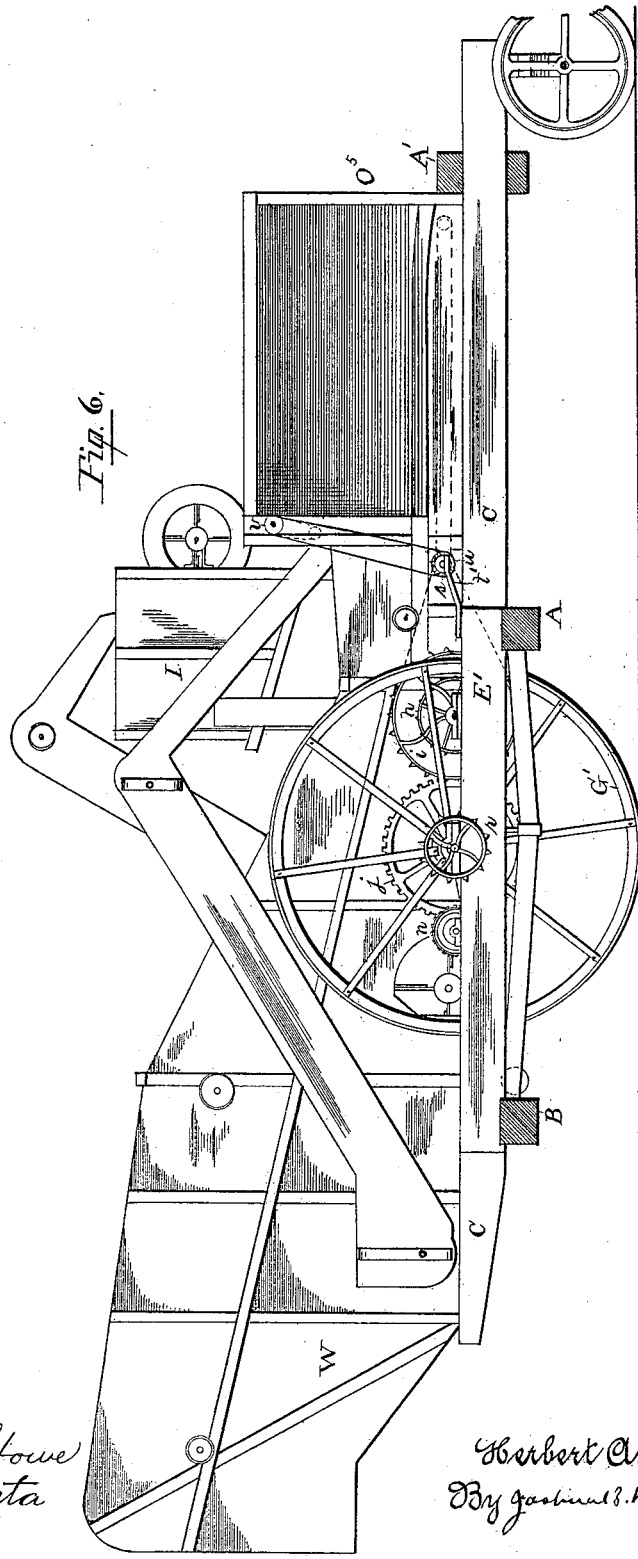

(No Model.) 7 Sheets—Sheet 7.
H. A. BENTON.
COMBINED HEADER AND THRASHER.
No. 338,699. Patented Mar. 30, 1886.
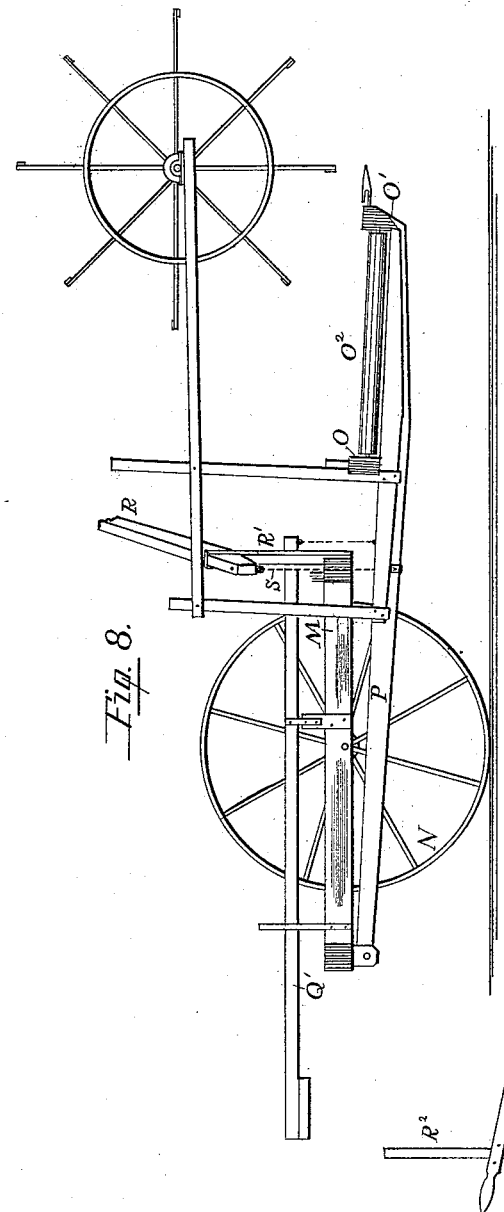
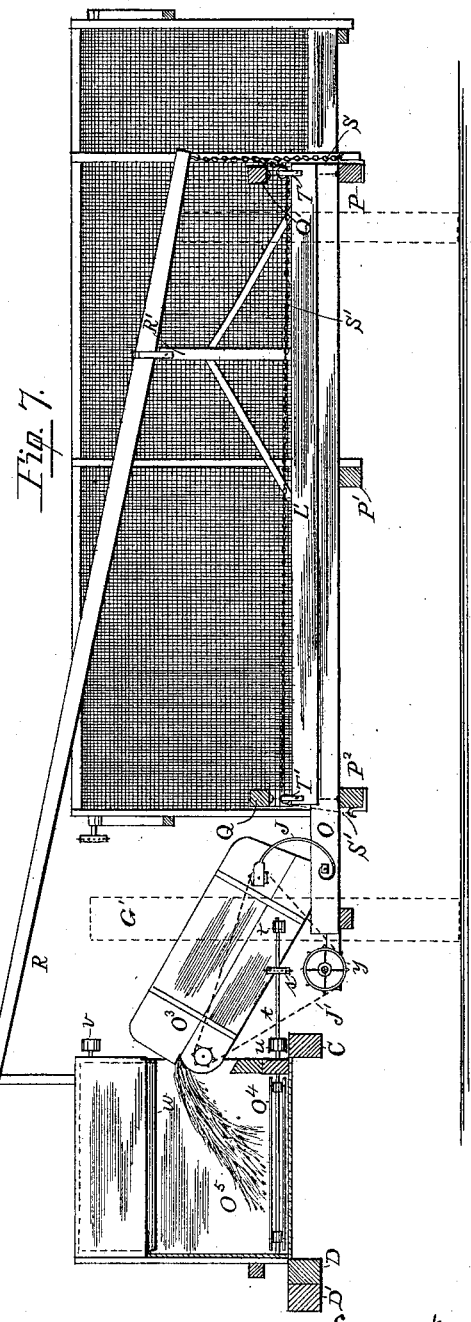
Witnesses:
Elihu P. Stowe
Wesley Hinta
Inventor:
Herbert A. Benton.
By Joshua B. Webster Atty.

UNITED STATES PATENT OFFICE.

HERBERT A. BENTON, OF FARMINGTON, CALIFORNIA.

COMBINED HEADER AND THRASHER.

SPECIFICATION forming part of Letters Patent No. 338,699, dated March 30, 1886.

Application filed January 15, 1885. Serial No. 152,936. (No model.)

*To all whom it may concern:*

Be it known that I, HERBERT A. BENTON, a citizen of the United States, residing at Farmington, in the county of San Joaquin and State of California, have invented certain new and useful Improvements in Combined Headers and Thrashers, of which the following is a specification, reference being had therein to the accompanying drawings, and to the letters and figures of reference marked thereon, which form a part of this specification.

My invention relates to an improvement in that class of harvesters known as "combined headers and thrashers;" and it consists, first, in a frame for the machine, adapted to have the thrashing mechanism placed upon it, and to have the heading and conveying mechanism hinged to its side; secondly, in the gearing which actuates the entire machine; thirdly, in the leverage device and manner of adjusting the conveying mechanism; fourthly, in a draft device; fifthly, in the combination and arrangement of devices that will be more fully set forth hereinafter, and particularly pointed out in the claims.

In the accompanying drawings, Figure 1 is a top plan view of the lower portion of the thrasher-frame, showing the carrying-wheels, gearing, and braces attached thereto complete. Fig. 2 is a top plan view of the lower portion of the header mechanism, showing frame-work, carrying-wheel, and a portion of the gearing. Fig. 3 is a top plan view of the thrasher complete. Fig. 4 is a top plan of the header complete, showing the cutting and conveying mechanisms and portions of the driving-gear and the balancing devices. Fig. 5 is a left-hand-side elevation of the entire machine. Fig. 6 is a right-hand side elevation of the thrasher complete. Fig. 7 is a section through line $x$ $x$ of Figs. 3 and 4. Fig. 8 is a right-side elevation of the header.

The frame of my machine, upon which the thrasher and its operating devices and a portion of the operating header devices are supported, consists of the main front cross-beam, A, the main rear cross-beam, B, extending the whole width of the thrasher, and the longitudinal beams C, D, E, E', E², E³, and E⁴, all of which are bolted or otherwise secured to the cross-beams A and B. Upon the beams E and E' and C are secured the journal-bearings for the axle $k$ of the wheel G'. Upon the beams E², E³, and E⁴ are secured the journal-bearings for the axle $b$ of the wheel G. The beams C and D extend forward of cross-beam A, their front ends being girded together by the beam A'. The draft apparatus consists of forward-extending beam D', attached at its rear to beam A, and connecting at its front with a beam, C', extending diagonally rearward and attaching at its rear to beam C. A diagonal brace, D², extends from forward end of beam D' to outside end of beam A, and a diagonal brace, C², also extends from the forward end of beam D' rearward to beam A at its connection with beam C. The beam A' rests upon and is attached to beams C' and D'. The points of connection of beams C' and D' rests upon and are attached by a king-bolt to the axle of the forward trucks, to which axle is attached the requisite draft-pole.

The actuating-gearing for the thrasher consists of gear-wheel $a$ on shaft $b$ of the wheel G, engaging with pinions $c$ on shaft $e$. On shaft $e$ is also a spring-clutch, $d$, by means of which the actuating-gearing of the thrasher may be thrown out of action. A gear, $f$, on shaft $e$ near beam D, engages with pinion $g$ on end of cylinder-shaft. The shaft $e$ also has two sprocket-wheels thereon—viz., the sprocket-wheel $h$ on the right-hand side of the beam C, and the sprocket-wheel $i$ on the left-hand side of the beam E'.

From the sprocket-wheel $h$ the working machinery of the separator is set in motion and the sprocket-wheel $i$ actuates one of the feeders of the cylinder. $j$ is a gear-wheel on shaft $k$ of wheel G', and $l$ is a pinion on a shaft, $m$, having its journal-bearings on beam E' and C. A bevel-gear, $n$, engages with a bevel-pinion, $o$, on a tumbling-shaft, $p$, from which motion is imparted to the draper and sickle, as will be shown.

At the outer end of axle $k$ is a sprocket-wheel, $r$, which may be connected by a chain-belt with a sprocket-wheel on end of reel-shaft and operates the reel.

The sprocket-wheel $i$ on shaft $e$ is connected by chain-belt with sprocket-wheel $s$ on a shaft, $t$, having a pulley, $u$, connected by belt with a pulley, $v$, on the actuating-shaft of a vertical self-feeder, $w$, in front of and above the cylinder. The shaft $t$ has its outer box on the end of an iron arm, $t'$, on beam E', just in front of wheel G'. The tumbling crank-shaft $p$ X, which is in two sections, having a sprocket-wheel, $y$, on one end, which may be connected by chain-belt with a sprocket-wheel on end of a shaft at the upper end of spout of header, and actuate the upper end of the draper. The rod X has also at its forward end a crank-disk, X', operating a pitman, $X^2$, which connects with and gives motion to the sickle.

H is a sacking-platform, secured to beam A at its rear and rests upon brace $D^2$. Upon its forward corner is a sack-dumper, H', and a tool-box, $H^2$, at forward edge. The cleaner I is in the rear of the platform H. It stands on four legs, the two outer of which are attached to beam D', and the other two at any desired points.

W is the main trunk of the thrasher containing the conveying and separating features.

F and F' are braces with turn-buckle centers for tightening and slackening the framework attached at ends of beams E and $E^4$.

L is the rear beam of the header. L' is the front beam.

M M' $M^2$ $M^3$ $M^4$ are the longitudinal beams, bolted or otherwise secured to beams L and L'.

$M^5$ and $M^6$ are diagonal beams attached to the end of the beams L and L', securing rigidity to the frame-work. They intersect the beam $M^2$ at its center and above it. A beam, $M^7$, is parallel with beam $M^6$ and beneath it and the beam $M^2$. The beams of the conveyer are, O the rear beam, and O' the front beam, containing the guards and sickle. The draper $O^2$ is located between these bars. The beams O and O' are attached to forward-extending beams P, P', and $P^2$, attaching by hinges at their rear, respectively, to beams M $M^2$ $M^4$ at the rear ends of such beams. The header is attached to the thrasher by hinging beam L to beam E and beam L' to beam A. The draper-spout frame of spout $O^3$ hinges at its lower end to the beams O and O'. The draper $O^2$ travels the entire length of the beam O or O' and of the spout $O^3$, and discharges onto a feeder, $O^4$, in the feeder-box $O^5$, which feeder $O^4$ discharges into the mouth of the cylinder, aided by the vertical feeder $w$, which, being at right angles to feeder $O^4$, tends the flow of the grain directly into the mouth of the cylinder.

The feeders $w$ and $O^4$ may be of leather or canvas of suitable width, forming endless belts revolving around suitable shafts actuated by the usual system of pulleys and driving-belts. Their function is to feed the grain straw as fast as supplied from the draper, regularly and evenly into the mouth of the cylinder, both being located within the feeder-box $O^5$ in front of the cylinder. A spring, J, is attached to inner end of beam O and is bifurcated at its head to admit of a sprocket-wheel, which engages with a chain-belt, J', connecting it with sprocket-wheel $y$ on end of the shaft X, which actuates the draper as before shown. The purpose of the spring J is to permit the tension of the chain-belt to slack or tighten as the case may require. The leverage system of the header feature consists of balancing-beams Q and Q', having weights at their rear ends, the beam Q being attached at its front end by a chain to beam $P^2$ and having its fulcrum in vertical post on beam $M^4$, and the beam Q' being attached to beam P by chain and having its fulcrum on vertical post on beam M. A hand-lever, R, has its forward end attached by chain S to beam P, and by chain S' to beam $P^2$, passing underneath pulley T on end of beam L' and over a pulley, T', at opposite end of beam L'. The lever R has its fulcrum on post R', seated on beam L'. The rear end of lever R is within reach of the operator and engages with a post, $R^2$, seated on top of the feeder-box $O^5$.

As many features and points about my machine are common and well known, there is no occasion to describe them.

I do not desire to limit myself to the precise construction and arrangement of parts hereinbefore set forth, as it will be readily seen that many modifications may be made therein without departing from the spirit of my invention.

No claim is made in this application to any of the parts which constitute the thrasher, as they will form the subject-matter of another appliction. These parts are shown in this application only for the purpose of showing a combined header and thrasher.

Having thus described my invention, what I claim is—

1. In a header and thrasher, the combination of the main frame consisting of the transverse bars A B, longitudinal beams C, D, E, E', $E^2$, $E^3$, and $E^4$, the transverse beam A' at the forward ends of the said beams C D, the forward-extending draft-beam D' and diagonal draft-beam C', the brace-rods $C^2$ $D^2$, the front supporting-truck, the thrasher carried on the said main frame, and the header-frame, being the beams L L', hinged to the said beams E and A, substantially as and for the purpose set forth.

2. The main frame, constructed as described, the self-feeder, the thrasher and the cleaner carried on the said frame, in combination with the supporting and driving wheels G G', the axle $b$, provided with the gear-wheel $a$, the shaft $e$, provided with the pinion $c$, the clutch $d$, gear-wheel $f$, and sprocket-wheels $h$ $i$, connecting mechanism for operating the said self-feeder from the said sprocket-wheel $i$, connecting means for operating the thrasher from the sprocket-wheel $h$, the pinion $g$, connected to the cleaning-cylinder and meshing into the said gear-wheel $f$, the header-frame carrying the reel, the sickle, and the draper; the axle $k$, provided with the sprocket $r$, for driving the reel, and the gear-wheel $j$, the shaft $m$, provided with the pinion $l$, and bevel gear-wheel $n$ on the tumbling-shaft $p\,x$, provided with the bevel-pinion O, a crank-wheel for driving the sickle, and the sprocket-wheel y, for driving the draper.

3. The combination of the thrasher, the feeder-box O⁵, located in front of the cylinder, the self-feeder O⁴, and the vertical self-feeder w, both carried in said box, the shaft of the last-named feeder having the pulley v, sprocket-wheel i, shaft t, provided with the sprocket-wheel s and pulley n, and the connecting-belts, substantially as and for the purpose set forth.

4. The combination, with the feeder and the shaft t, of the bearing-iron t', secured to the forward end of the frame E', and projecting forward from the same, substantially as described.

5. In combination with the main frame, the header-frame, the draper, and the sickle, the tumbling-shaft p X, provided with two universal joints, and the part p, located on the main frame, and the part X, provided with the crank-disk X', and sprocket-wheel y, the sickle-pitman, and a connecting-belt, whereby the said wheel y drives the draper, substantially as and for the purpose set forth.

6. The combination, with the beam A and brace-rod D², of the platform H, located as shown, the sack-dumper H', and tool-box H², substantially as shown and described.

7. The combination, substantially as herein shown and described, with the main frame, being the beams A and E, the transverse beams L and L', hinged to said beams E and A, respectively, the longitudinal beams M, M', M², M³, and M⁴, secured to the said transverse beams, the outer supporting-wheel, N, the forward-projecting beams P, P', and P², hinged, respectively, to the said beams M, M², and M⁴, the transverse beams O and O', the sickle carried on the said beam O', the draper O², the guide-boards or chute O³, means, substantially as described, for operating the said sickle and the said draper, and means, substantially as described, for adjusting the said beams P, P', and P², substantially as and for the purpose set forth.

8. The combination of the hinged beams P P², the beams M M⁴, the fulcrum-posts on said beams, the balance-lever Q Q', provided with weights and fulcrumed on said posts and connected to said beams, substantially as and for the purpose set forth.

9. The combination, with the header-frame and adjustable draper and sickle-frame, of the fulcrum-post R', and the guide-pulleys T T', all secured to the beam L', the post R², secured to the feed-box O, the lever R, fulcrumed on the post R', the chain S, connecting the outer end of said lever and passing around said guide-pulleys and secured to the said beam P², substantially as and for the purpose set forth.

10. The combination, with the thrashing mechanism and its return-spout, of the feeder-box O⁵, the self-feeder O⁴, and vertical feeder w, both contained in said feeder-box, whereby the lost grain will be delivered to the thrashing-cylinder, substantially as set forth.

11. In combination with the draper, its frame, and the chute O³, the sprocket-wheel y, the sprocket-wheel connected to the draper-roller, the drive-chain J', the spring J, secured to the beam O and bifurcated at its top, and the sprocket-wheel carried in the bifurcation, substantially as and for the purpose set forth.

12. The combination, with the main frame carrying the thrasher, and provided with the beams C' D' and brace-rods C² D², and the truck supporting the forward end of said main frame, of the header-frame provided with the diagonal beams M⁵ M⁶ on the transverse beams L L', the last-named beams being hinged, respectively, to the beams E and A of the said main frame, substantially as and for the purpose set forth.

13. The main frame consisting of the transverse beams A' A B, longitudinal beams E E' C' D E² E³ E⁴, diagonal brace-rods F F', forward-projecting bars C' D', brace-rods C² D², and supporting and driven wheels, arranged and combined substantially as shown and described, and for the purpose set forth.

In testimony whereof I affix my signature in presence of two witnesses.

HERBERT A. BENTON.

Witnesses:
JOSHUA B. WEBSTER,
ELIHU B. STOWE.